Dec. 26, 1922.
F. H. LIPPINCOTT.
AUTOMATIC CLUTCH.
FILED MAR. 14, 1921.
1,440,160
4 SHEETS-SHEET 4
Fig. 4.
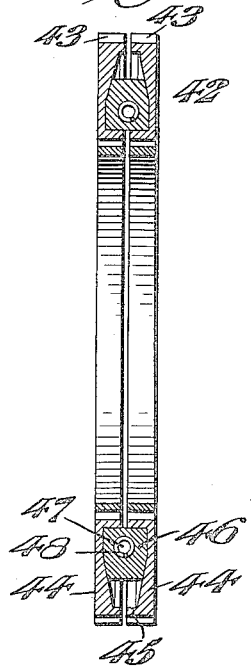
Fig. 5.
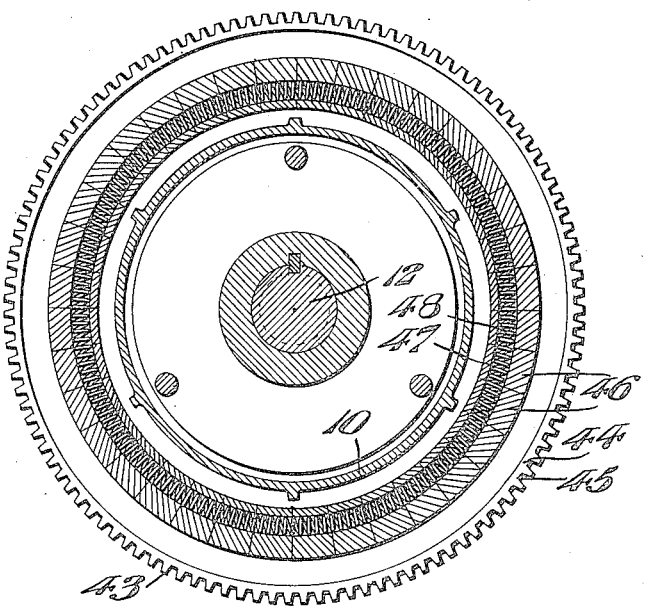
Fig. 9.
Fig. 7. Fig. 8.
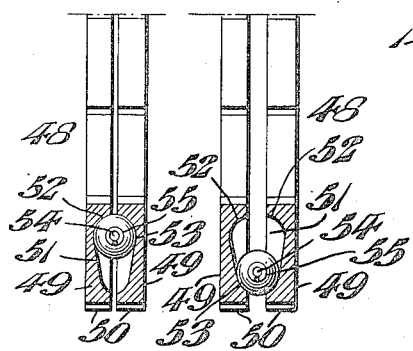
Fig. 6.
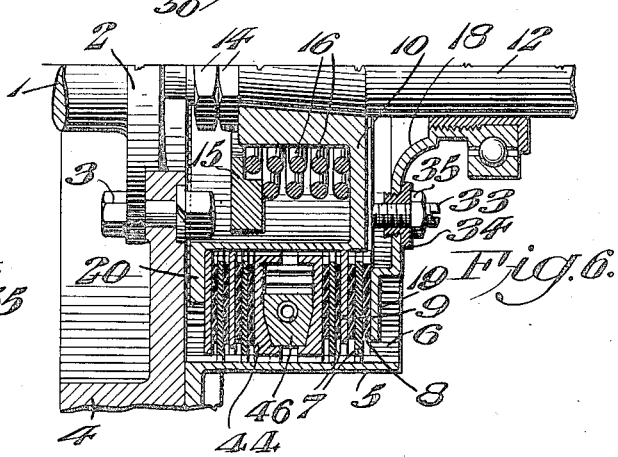
INVENTOR
Fisher H. Lippincott
BY
Riedesheim Fairbanks
ATTORNEYS Patented Dec. 26, 1922.

1,440,160

UNITED STATES PATENT OFFICE.

FISHER H. LIPPINCOTT, OF PHILADELPHIA, PENNSYLVANIA, ASSIGNOR TO LIPPIN-COTT-CARWEN CORPORATION, OF PHILADELPHIA, PENNSYLVANIA, A CORPORATION OF DELAWARE.

AUTOMATIC CLUTCH.

Application filed March 14, 1921. Serial No. 452,269.

*To all whom it may concern:*

Be it known that I, FISHER H. LIPPINCOTT, a citizen of the United States, residing at Philadelphia, county of Philadelphia, State of Pennsylvania, have invented a new and useful Automatic Clutch, of which the following is a specification.

In my prior Patent No. 1,327,767, dated January 13th, 1920, for a variable speed clutch, I have described and generically claimed a novel construction and arrangement of a variable speed clutch wherein the friction elements, co-operating to operatively connect a driving and a driven member, are controlled by centrifugally acting means.

My present invention comprehends in its broad and generic scope a novel construction and arrangement of an automatic clutch, which is adapted to be employed in conjunction with any desired or conventional type of a multiple or other disc clutch.

It further comprehends a novel construction of an automatic clutch wherein the friction between the friction elements, which serve to effect an operative connection between the driving and the driven member, is increased from a set standard on an increase in speed of the driven member, and wherein on a decrease in speed the effective friction between the friction elements is decreased or entirely released.

My present invention while not limited to such use is especially adapted to be employed in conjunction with motor driven vehicles in order to maintain the high speed relation between the engine and the driven shaft and to govern the power and speed by engine throttling.

It also allows the driven shaft in starting to pick up its speed more gradually. One is also enabled to provide a better and more flexible adjustment than can be obtained with the ordinary variable speed clutch of the friction type.

Other novel features of construction and advantage will hereinafter more fully appear in the detailed description of the invention.

For the purpose of illustrating my invention, I have shown in the accompanying drawings typical embodiments thereof which are at present preferred by me, since these embodiments will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 4 represents a sectional view of another embodiment of my invention.

Figure 5 represents a sectional view of an automatic clutch, in connection with which the embodiment seen in Figure 4 is employed.

Figure 6 represents, in sectional elevation and in assembled condition, the embodiment seen in Figures 4 and 5.

Figure 7 represents, in section, another embodiment of my invention.

Figure 8 represents, in section, the embodiment seen in Figure 7 but showing the parts in a different relation from that seen in Figure 7.

Figure 9 represents, in section and on an enlarged scale, a portion of the clutch showing more particularly the automatic controlling means seen in Figures 7 and 8.

Similar numerals of reference indicate corresponding parts.

Figure 1:
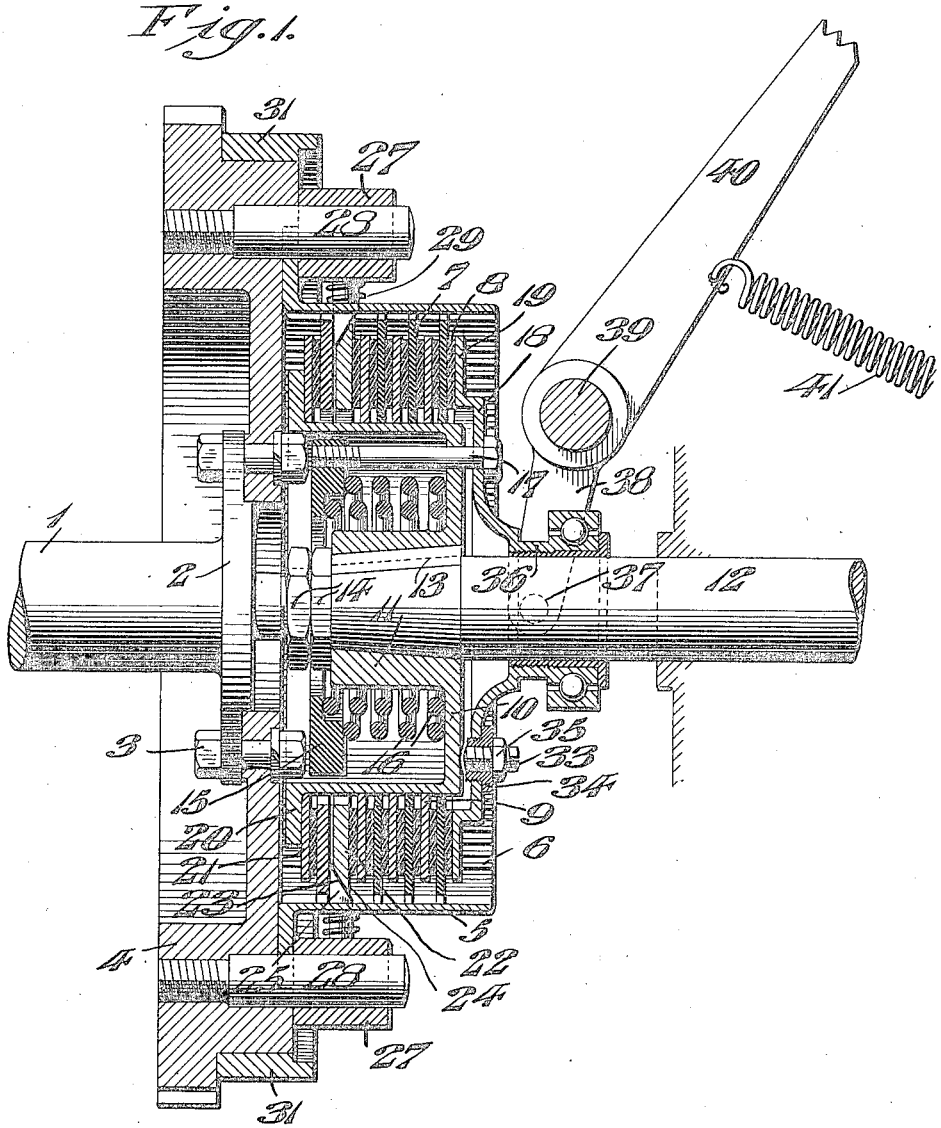
Figure 1 represents a section substantially on line 1—1 of Figure 3, of an automatic clutch, embodying my invention.

Referring to the drawings.

Figure 2:
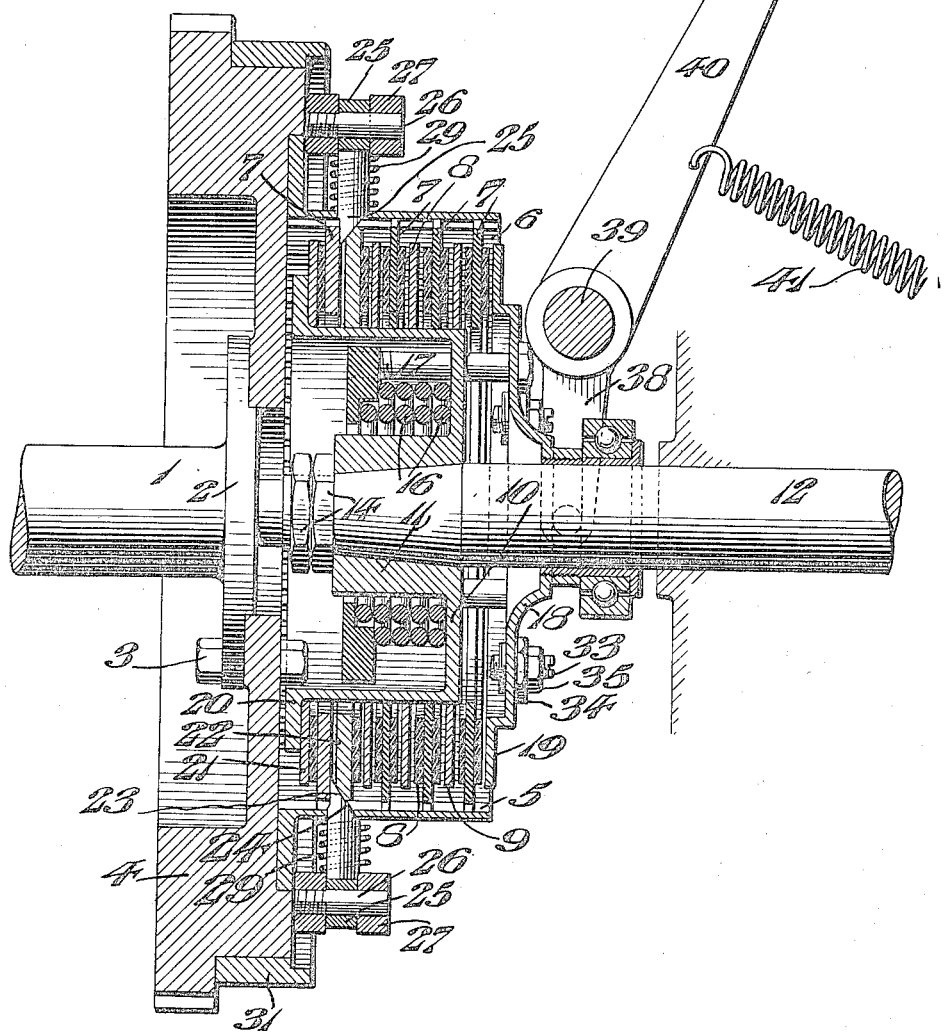
Figure 2 represents a section on line 2—2 of Figure 3, showing certain of the parts in a different relation to each other from that seen in Figure 1, and in declutched position.

1 designates a driving member which, as seen in Figures 1 and 2, may be the engine or driving shaft. The free end of the driving member 1 is provided with a head 2 to which is connected by means of fastening devices 3 the fly wheel 4. The fly wheel 4 has secured to it in any desired manner the flanges of a drum 5 which has integral with it or connected to it an internal gear 6. 7 designates friction discs intergeared at their outer periphery with the internal gear 6 of the drum 5. Secured, if desired, to these friction discs 7 in any desired manner are friction discs 8 certain of which are interposed between the driving friction discs 7 and the driven friction discs 9. The driven friction discs 9 are keyed to an inner clutch drum 10, the hub 11 of which is secured to the driven member 12, which, as illustrated, is a driven shaft, by being keyed thereon, as indicated at 13, and by means of nuts 14 in threaded engagement with the driven member, one of said nuts serving as a lock nut.

15 designates a follower ring between which and the inner clutch drum 10 is interposed one or more coiled or other springs 16. The follower ring 15 has connected to it the inner ends of the bolts 17 which pass through the rear end of the clutch drum 10 and through a clutch disc 18 which is provided with an annular flange 19 adapted to be in frictional engagement with the juxtaposed friction disc 8. The inner clutch drum 10 is provided with a laterally extending flange 20 against the outer face of which abuts a friction disc 21, which, in turn, is in frictional engagement with the juxtaposed friction disc 8.

Figure 3:
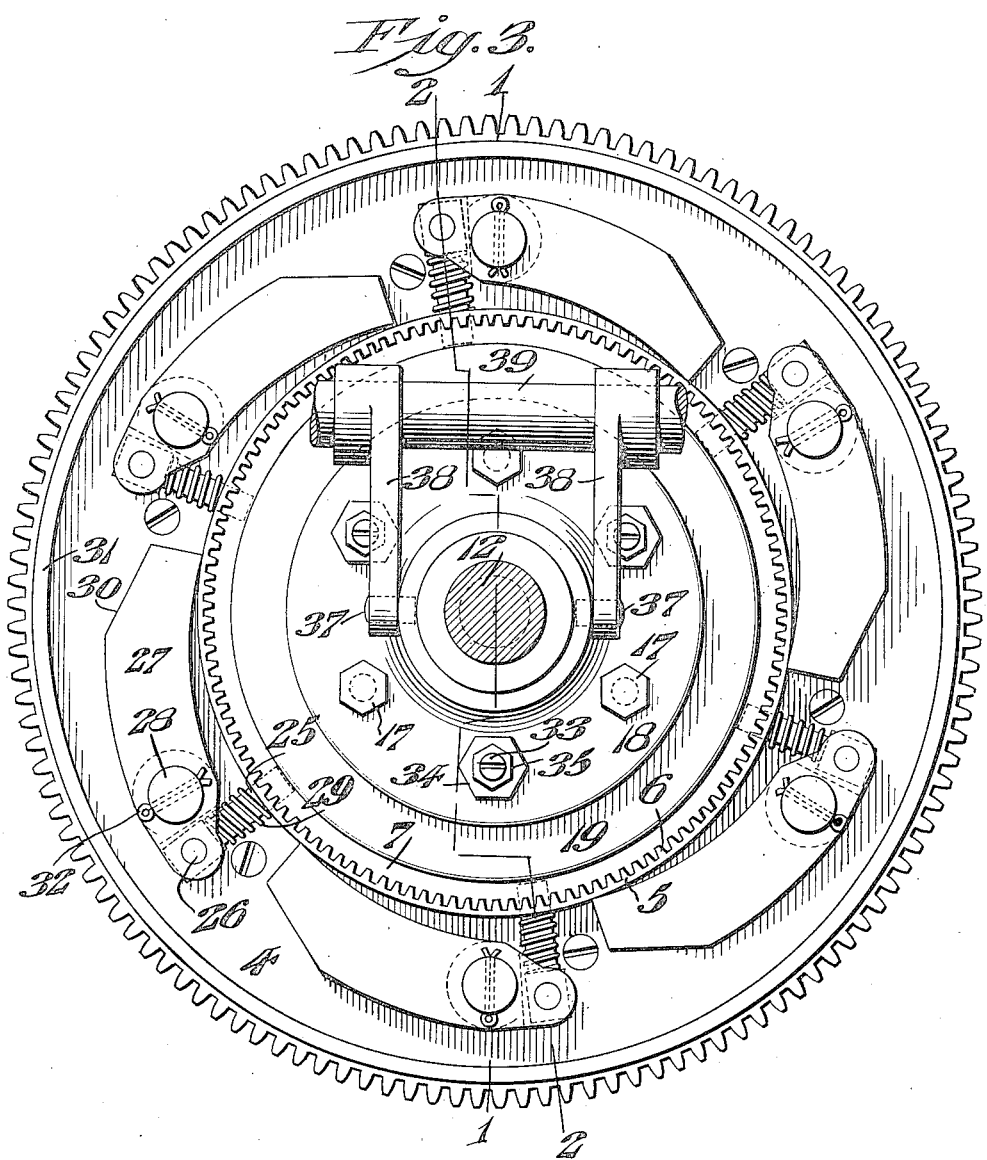
Figure 3 represents an end elevation of the variable speed clutch, the driven shaft being shown in section.

22 designates a friction disc keyed to the inner periphery of the outer clutch drum 5, and the outer periphery of this friction disc 22 is provided with a beveled or inclined face 23, with which is adapted to cooperate the inclined or bevelled face 24 of a pin or wedge 25 which is pivotally connected at 26, see Figure 3, to one end of a lever 27, said lever being free to oscillate on the guide pin 28 but being maintained at certain times in the position seen in Figure 3 by means of a spring 29 encircling the pin 25. The neutral position of the pins or wedges 25 is seen in Figure 2. I preferably employ a plurality of controlling pins 25 and controlling levers 27 and for purpose of illustration, I have shown in Figure 3 six of such controlling levers and their adjuncts, it being understood that any desired number may be employed. The outer face near the free end of the lever 27 is preferably faced-off, as indicated at 30, in order that the outward movement of such end of the lever will be limited by contact with the portion of the ring 31 which overhangs the levers 27. The levers 27 are retained in assembled position by means of suitable fastening devices 32 such as, for example, the cotter pins illustrated, which pass through the guide pins 28.

The friction disc 7 next to the friction disc 22 is preferably but not necessarily of greater thickness than the other friction discs 7. The friction disc 18 forms a pressure transmitting disc and is provided with a desired number of adjusting screws 33 which are in threaded engagement with the bushings 34 and the adjusted position of these adjusting screws 33 is maintained by means of the nuts 35. The pressure transmitting disc 18 is provided with a clutch collar 36 into which extend the clutch pins 37 of the clutch arms 38 which are mounted on a rock shaft 39 on which latter is also mounted a clutch lever 40 which is under the control of the operator of the vehicle.

41 designates a spring, one end of which is connected to the clutch arm 40 and the other end of which is secured to a stationary part of the mechanism.

Referring now to the embodiments seen in Figures 4, 5 and 6, I have shown in these embodiments a different type of centrifugally actuated controlling means for the friction elements.

Instead of employing a series of levers and wedge pins to effect the automatic increase in friction between the friction elements on an increase in engine speed or the desired frictional lock between the friction elements on a decrease in the engine speed, I employ one or more pairs of friction members 42 which are provided with teeth 43 at their outer periphery to mesh with the internal gear 6. Each friction member 44 of a pair is provided with a recess opening through one of its side walls, and juxtaposed recesses contribute to form an annular groove 45 the side walls of which converge outwardly. This groove is adapted to receive wedges 46, the side walls of which from points in proximity to their inner faces converge outwardly so that due to centrifugal action the discs will be separated as the wedges move outwardly. The wedges are preferably apertured as at 47 in order to receive a coiled or other spring 48 which forms an annular resilient element which tends to move the wedges inwardly.

It will be understood from Figure 6 that a pair of wedge carrying friction discs are interposed between friction elements of the disc clutch.

In the embodiment seen in Figures 7, 8 and 9, I employ one or more pairs of friction discs, each pair consisting of friction discs 49 having teeth 50 at their outer periphery to mesh with the teeth of the internal gear 6. The side walls of the discs 49 are recessed to form an annular groove 51. The side walls of the groove 51 converge outwardly and the bottom wall is curved, as at 52, to conform to the contour of the balls 53 which latter are apertured, as at 54, to receive a spring 55 which forms an annular resilient element tending to move the balls inwardly, the balls moving outwardly due to centrifugal action.

It will be understood that in practice the friction elements and their adjuncts are inclosed within a casing containing a lubricant but as such casing and the manner of assembling it will be readily apparent to those skilled in this art, I have deemed it to be unnecessary to illustrate or describe such oil casing, as any desired or conventional type of oil casing or lubricating means may be employed.

The adjusting bolts 17 and adjusting screws 33 are set in their adjusted position in such a manner that the clutch will not take hold when the lever arms 27 are in their normal position. The lever adjusting springs 29 are of the proper strength to hold the levers 27 in their normal position at a predetermined engine speed, for example, they may be of such strength as to hold these levers in normal position at an engine or driving speed of five miles per hour. The levers are so constructed and arranged as to have a desired percentage more power at a given speed than the clutch spring 16.

The operation of my invention will now be readily apparent to those skilled in this art and is as follows:—

Referring first to Figures 1 to 3 inclusive, it will be apparent that due to centrifugal action the levers 27 on an increase in speed above the set speed standard of the driving member, by which they are driven will swing outwardly, thereby causing the pins or wedges 25 to move inwardly, and acting on the friction member 22 effect lateral displacement of the other friction elements and vary the degree of friction between the different sets of friction elements.

When the speed of the driving member decreases below the predetermined standard of speed at which the wedges move inwardly, the weighted ends of the levers 27 will move inwardly toward the drum 5 and the pins or wedges 25 carried at the opposite ends of such levers will move outwardly thereby reducing the degree of friction between the friction elements, and thus reduce the degree of friction between the driving member and the driven member. The range of movement of the weighted ends of the levers 27 is limited by the drum 5 and the overhanging portion of the ring or annulus 31. The weighted ends of the levers 27 are preferably constructed and arranged in such a manner that they do not overcome the action of the clutch spring 16 to retain the friction elements in substantially a locked condition until the speed of the driving member has reached a desired standard of speed. For example, I have found that in practice very advantageous results are obtained if the parts are so proportioned that this action does not take place until the driving member reaches a speed equivalent to fifteen to eighteen miles per hour of the motor vehicle.

Referring now to the embodiment seen in Figures 4, 5 and 6, it will be apparent that due to centrifugal action the wedges 46, which form weights will be moved outwardly against the resistance of the spring 48 as the speed of the driving member increases beyond the predetermined standard. thereby causing an increase of friction between the friction elements. If the speed of the driving member decreases below the predetermined standard, there will be a decrease in friction between the friction elements, as is apparent.

As the principle involved in the embodiments seen in Figures 7, 8 and 9 is the same as that in Figures 4, 5 and 6, a detailed description of the operation is believed to be unnecessary as the only difference is that the weights are in the form of balls 53 instead of wedges 46.

It will be apparent that in all of the embodiments of my invention herein shown, I provide an automatic driving mechanism wherein the driving and driven members are operatively connected together by means of friction elements which permit slippage between such elements during the application of the drive until the driven shaft has picked up its speed, and which, in the event of a certain increase in load, will allow slippage between the friction elements until the load is relieved or until the speed of the driving shaft is increased to compensate for the increased load.

It will be further apparent that mechanical means are provided such as the arm 40 and its adjuncts which are under the control of the operator to vary at will the degree of friction between the frictional elements which form the operative connection between the driving and the driven members.

It will be understood that in accordance with my present invention the friction discs 8 may be floating between the friction discs 7 and 9 or they may be attached to either the friction discs 7 or to the friction discs 9 as may be desired by the manufacturer.

If the operator desires to change the gears in order to vary the speed at which the automobile is driven, the operator releases entirely the clutch by the actuation of a foot pedal or its equivalent operatively connected with the arm 40. This condition is illustrated in Figure 2 of the drawings from which it will be seen that when the clutch is released in this manner there is a clearance between the stop members 33 and the clutch drum 10. It will thus be seen that the purpose of the stop members 33 is to release the friction of the friction elements when the engine speed is less than the predetermined standard of speed, since, if these stop members were not employed, the spring 16 would effect the frictional engagement of the friction elements. These stop members also serve as an adjustment to compensate for the wear of the friction elements.

It will now be apparent that I have devised a new and useful automatic clutch which embodies the features of advantage enumerated as desirable in the statement of the invention and the above description, and while I have, in the present instance, shown and described preferred embodiments thereof which will give in practice satisfactory and reliable results, it is to be understood that such embodiments are susceptible of modification in various particulars without departing from the spirit or scope of the invention or sacrificing any of its advantages.

Having thus described my invention, what I claim as new and desire to secure by Letters Patent, is:—

1. In an automatic speed driving mechanism, the combination of a driving member, a driven member, a set of driving and a set of driven friction discs contributing to form an operative connection between said members, centrifugally acting means to effect lateral displacement of the friction discs to automatically vary the degree of friction between them as the speed of said driving member varies, resilient means separate from said centrifugally acting means tending to bring said friction discs together, and means separate from said centrifugally acting means to take up wear of the friction discs.

2. In an automatic speed driving mechanism, the combination of a driving member, a driven member, a set of driving and a set of driven friction discs contributing to form an operative connection between said members, centrifugally acting means to effect lateral displacement of the friction discs to automatically vary the degree of friction between them as the speed of said driving member varies, mechanical means under the control of the operator to permit lateral displacement of said friction discs to vary at will the degree of friction between them without controlling said centrifugally acting means, and adjustable means to take up wear of the friction discs.

3. In an automatic speed driving mechanism, the combination of a driving member, a driven member, a set of friction elements operatively connected with said driving member, a set of friction elements operatively connected with said driven member, friction means disposed between friction elements of the sets, and centrifugally acting means to effect lateral displacement of said friction means and thereby of said friction elements to vary the frictional drive between the driving and driven members in accordance with the speed of said driving member.

4. In an automatic speed driving mechanism, the combination of a driving member, a driven member, a set of friction elements intergeared with said driving member, a cooperating set of friction elements connected to and laterally movable on said driven member, friction means disposed between friction elements of said sets, and centrifugally acting means to effect lateral displacement of said friction means to vary the degree of frictional drive between said members in accordance with varying speed of said driving member.

5. In an automatic speed driving mechanism, the combination of a driving member, a driven member, a set of friction elements intergeared with said driving member, a cooperating set of friction elements connected to and laterally movable on said driven member, a third set of co-operating friction elements, friction means disposed between friction elements of said sets, and centrifugally acting means to effect lateral displacement of said friction means to vary the degree of frictional drive between said members in accordance with varying speed of said driving member.

6. In an automatic speed driving mechanism, the combination of a driving member, a driven member, friction discs forming an operating connection between said members, resilient means tending to hold said discs in frictional engagement, centrifugally acting means to increase the frictional grip of said friction discs as the speed of the driving member increases above a predetermined speed and to decrease the frictional grip of said friction discs as the speed of the driving member falls to said predetermined speed, and means separate from said centrifugally acting means to take up wear of the friction discs.

7. In an automatic speed driving mechanism, the combination of a driving member, a driven member, friction elements forming an operative connection between said members, resilient means tending to hold said elements in frictional engagement, centrifugally acting means to increase the frictional grip of said friction elements as the speed of the driving member increases above a predetermined speed and to decrease the frictional grip of said friction elements as the speed of the driving member falls to said predetermined speed, said means including levers the power arms of which are subjected to centrifugal action, and means separate from said levers to take up wear of the friction discs.

8. In an automatic speed driving mechanism, the combination of a driving member, a driven member, friction elements forming an operative connection between said members, resilient means tending to hold said elements in frictional engagement, centrifugally acting means to increase the frictional grip of said friction elements as the speed of the driving member increases above a predetermined speed and to decrease the frictional grip of said friction elements as the speed of the driving member falls to said predetermined speed, said means including levers the power arms of which have a limited range of movement under centrifugal action, and adjustable means separate from said levers to take up wear of the friction discs.

9. In an automatic speed driving mechanism, the combination of a driving member, a driven member, friction elements forming an operative connection between said members, resilient means tending to hold said elements in frictional engagement, centrifugally acting means to increase the frictional grip of said friction elements as the speed of the driving member increases above a predetermined speed and to decrease the frictional grip of said friction elements as the speed of the driving member falls to said predetermined speed, means under the control of the operator to vary at will the degree of friction between said friction elements, and adjustable means to effect the automatic release of the friction of the friction elements when the speed of the driving member falls below said predetermined speed, said adjustable means serving also to compensate for wear of the friction elements.

10. In an automatic speed driving mechanism, the combination of a driving member, a driven member, friction elements forming an operative connection between them, resilient means tending to move said elements together, wedge devices carried by the driving member and co-operating with juxtaposed friction discs to effect the engagement and release of said friction elements, and levers controlled by centrifugal action and in turn controlling said wedge devices.

11. In an automatic speed driving mechanism, the combination of a driving member, a driven member, friction elements forming an operative connection between them, resilient means tending to move said elements together, wedge devices carried by the driving member, to effect the engagement and release of said friction elements, levers controlled by centrifugal action and in turn controlling said wedge devices, and springs tending to move said wedge devices into their neutral position.

12. In an automatic speed driving mechanism, the combination of a driving member, a driven member, friction elements forming an operative connection between them, one of said friction elements having an inclined face, resilient means tending to move said elements together, centrifugally acting wedges to co-operate with said inclined face to cause the engagement of said friction elements on the increase in speed of the driving member above a set standard and to cause a release of said friction elements when the speed of the driving member falls to said set standard, and adjustable means to compensate for wear of said friction elements.

13. In an automatic speed driving mechanism, the combination of a driving member, a driven member, sets of driving and driven friction discs contributing to form an operative connection between said members, centrifugally acting means to effect lateral displacement of the friction discs to form a driving engagement between them, means independent of the friction discs to limit the maximum stroke of said centrifugally acting means, and means separate from said centrifugally acting means to take up the wear of the friction discs.

FISHER H. LIPPINCOTT.

Witnesses:
H. S. FAIRBANKS,
C. D. McVAY.